April 12, 1966  J. S. ANDERSON ETAL  3,245,727
ANTI-SKID BRAKE CONTROL SYSTEM
Filed Aug. 15, 1962  2 Sheets-Sheet 2
Fig. 1b.
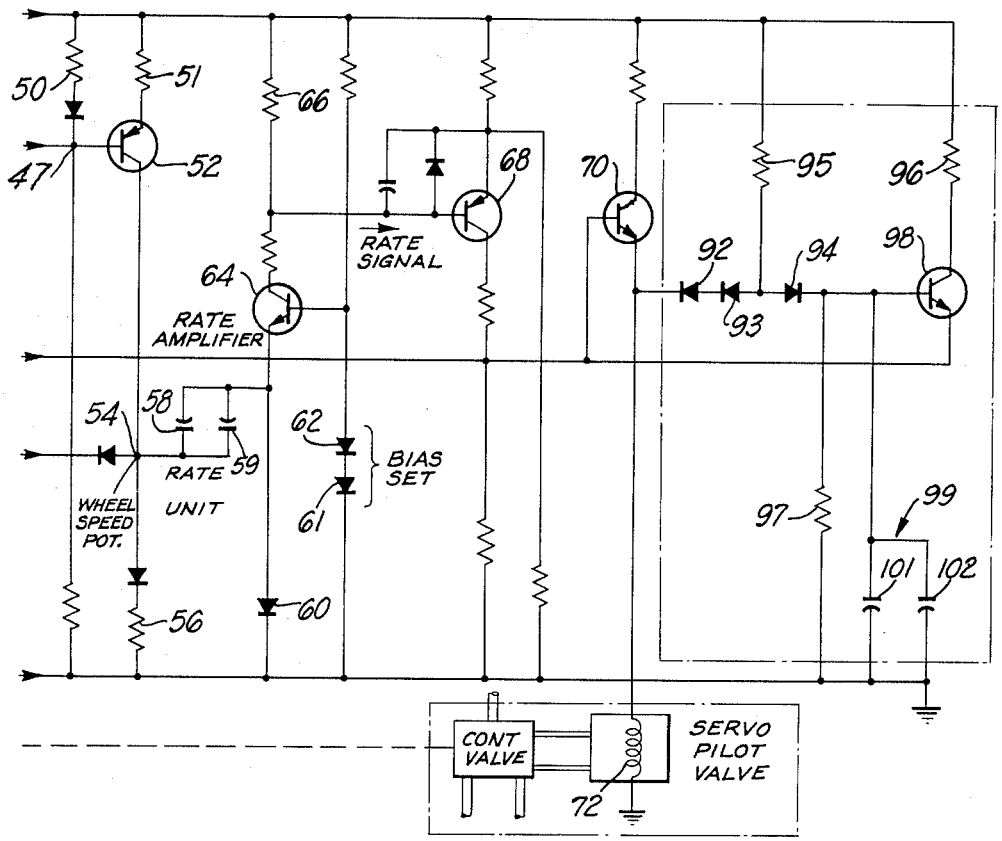
Fig. 3.
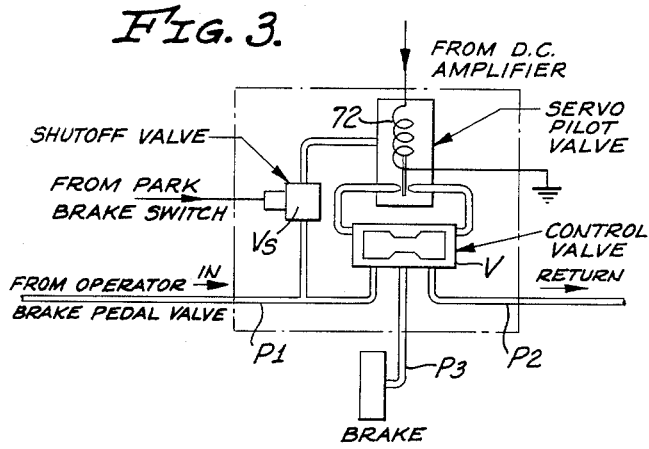
INVENTORS
JACK S. ANDERSON,
DANIEL R. SMITH &
MAURICE A. GAGE
BY
ATTORNEY

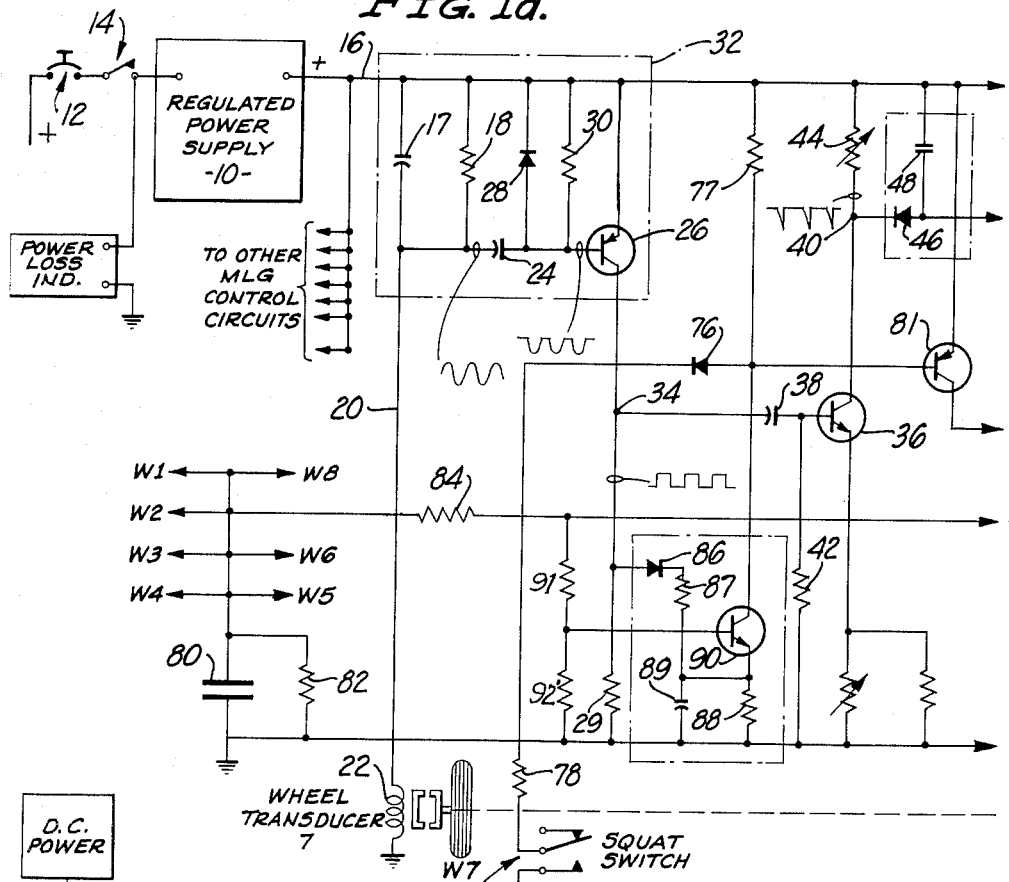

United States Patent Office

3,245,727
Patented Apr. 12, 1966

3,245,727
ANTI-SKID BRAKE CONTROL SYSTEM
Jack S. Anderson, Pasadena, Maurice A. Gage, Van Nuys, and Daniel R. Smith, Granada Hills, Calif., assignors to Crane Co., Chicago, Ill., a corporation of Illinois
Filed Aug. 15, 1962, Ser. No. 221,650
(Filed under Rule 47(a) and 35 U.S.C. 116)
22 Claims. (Cl. 303—21)

The invention herein disclosed pertains to brake control systems for vehicles, and more particularly to such systems for vehicles having several independently rotatable load-bearing wheels each of which is equipped with a respective unit comprising a brake and brake-applying means. As herein illustrated and described the invention is applied in connection with an aircraft of the type having a nose landing gear (NLG) unit comprising two independently rotatable wheels and two main landing gear (MLG) units each comprising two sets of wheels each set of which comprises two independently rotatable wheels. The exemplary vehicle thus comprises ten load-bearing brake-equipped wheels.

It is known in the art to provide braking systems for vehicles of the types mentioned, in which systems means are provided to alleviate the undesirable effects of wheel skidding. A much improved system developed to automatically control the braking effort at each wheel so as to more nearly approach skid-free operation with greatly increased braking effectiveness is disclosed in copending application entitled "Automatic Brake Control System," Serial No. 217,509, filed July 25, 1962, by Bernard B. Thompson and Donald J. O'Connell and assigned to the assignee of this invention. In that system, the disclosure of which is herein incorporated by reference, the braking effort applied to any particular wheel of the set of wheels being braked is controlled in response to the amount of skid of the wheel, that is, in response to the difference between the actual wheel speed relative to the speed of the fastest wheel of the set. The system is so composed and adjusted that under maximum skidless braking effort a desired amount of slip of any wheel relative to the track or runway is secured; and safety means are provided to avoid concurrent continued skidding of all wheels. That system is such that a continuing measure of the instantaneous speed of the fastest wheel is registered in a memory device and any wheel whose speed measure decreases (due to skidding, for example) below the registered measure is quickly relieved of some braking effort whereby it may come to the speed of the fastest wheel. Thus near-optimum braking effect can be attained.

The present invention is an improvement upon that disclosed in the aforementioned application. Whereas in the previously disclosed invention actual slipping of a wheel to at least a small degree was necessary before reduction of braking effort applied to that wheel occurred, in the present invention the rate of change of rotational speed of the wheel is the criterion of the control function. Thus the system according to the invention includes means for registering a value representative of the maximum rate of deceleration and means for sensing rotational speed and rate of change of rotational speed and registering a value representative thereof, in the case of each respective wheel, and for regulating the application of braking effort to that wheel in accordance with the result of a comparison of the registered values. If brake application is excessive, relaxation is effected, without necessity for actual skidding prior to initiation of reduction of brake application. Application of braking effort is caused by decreasing the extent of by-passing or bleeding of hydraulic fluid around the brake cylinder, whereby the pressure applied to the brake piston is increased. Conversely, relaxation of braking effort is effected by increasing the extent of by-passing or bleeding of the fluid. By-passing of fluid is effected by a slave valve hydraulically controlled by a servo pilot valve having an electromagnetically controlled vane. In the absence of a signal to the pilot valve the braking is controlled directly by the operator's brake pedal action. Thus in the absence of incipient skidding condition no electrical signal is supplied to the pilot valve and braking effort is determined by operator pedal action only.

In the illustrated exemplary system which is hereinafter described in detail, an individual control circuit is provided for each wheel. Description will largely be limited to a single control circuit except as is necessary to explain certain features of the combination of the individual systems. Power is supplied to each system from a regulated D.C. power supply unit. Power supplied to any wheel circuit is modulated by a wheel transducer of the respective wheel so as to comprise a wave that for practical purposes may be considered to be sinusoidal. The frequency of the sinusoidal wave is a direct or linear function of the rotational speed of the wheel, as will be later herein explained. The D.C. component is rejected and the sinusoidal potential is rectified and applied to a wave-shaping network to produce a square wave of potential. The square wave output of the network is applied to a differentiating and pulse-shaping network to produce a pulse-type wave which is integrated by an integrating network to produce a potential that varies linearly in proportion to the frequency of the pulses supplied to the network, and hence to the speed of the wheel. Thus there is produced an integration of representations of instantaneous wheel speed, that is, a potential representative of the instant value of the rotational speed of the wheel. The latter potential is applied to a transistor to decrease the current flow therethrough whereby a potential drop across a transistor circuit is decreased to lower a threshold potential to an extent permitting a predetermined preset potential to initiate conduction in another transistor circuit. The latter is used in an amplifier to produce a valve control signal effective to relax braking effort on the wheel. The variable threshold potential above mentioned is called the wheel speed potential.

The wheel speed potential of all the alike load-bearing wheels (MLG, or NLG) are applied to a single, or common memory circuit, for purposes presently explained.

A control potential is also supplied to the amplifier from the common memory circuit to provide for alleviation of locked-wheel effects. In normal braking action when less than maximum braking effort is called for by the operator, no signal is produced by the control circuit and fluid under pressure is metered to the brake cylinder under pressure determined by the brake pedal operation alone. When pedal operation supplies fluid under sufficient pressure to cause incipient skidding, that is, a rate of change of wheel speed in excess of the predetermined maximum deceleration rate, a control signal is produced by the control circuit and the pilot valve operates to cause bypassing of fluid and thus reduce the pressure applied to the brake cylinder. The measure of the reduction is proportional to the strength of the control signal. Reduction of the signal results in the opposite action.

In accord with the invention means are provided in connection with the control circuit to reduce or "modulate" the reapplication of increased pressure to the brake to a pressure slightly less than that which would cause skidding. Those means comprise circuit means functioning during relaxation of braking to create and store a bias signal and to utilize this bias signal to delay and to feather reapplication of braking effort after the brake relaxing signal disappears.

The preceding general description of the invention makes it evident that a principal object of the invention is to provide improvements in braking systems for vehicles of the type having a plurality of independently rotatable load-bearing wheels.

Another object of the invention is to provide a brake control system in which control of braking effort is made dependent upon rate of change of wheel rotational speed.

Another object of the invention is to provide means for maintaining an average brake pressure which produces maximum braking effort by means of a bias valve signal generated by the skid-time history of the wheel being braked.

Another object of the invention is to provide means for reducing the application of braking effort incident to rapidly repeated fluctuations in traction of the wheel being braked.

Other objects of the invention will be defined or made apparent in the appended claims and the following description of a preferred embodiment of the invention as illustrated in the accompanying drawings that form a part of this specification. In the drawings:

FIGURES 1a and 1b are portions of a schematic diagram of a brake control system according to the invention, as applied to an aircraft having eight main landing gear wheels, with only one of eight control circuits shown in detail.

FIGURE 2 is a schematic control diagram depicting principal components of a control system and indications of the direction of control function; and FIGURE 3 is a schematic diagram of portions of a hydraulic system including valve means, used according to the invention.

Referring to FIG. 1 of the drawings, there is schematically depicted a conventional D.C. power supply unit 10 which is rendered active by closure of a circuit breaker 12 and a pilot's switch 14 which are interposed in the positive lead of the power supply unit. Unit 10 is connected by way of a positive (+) lead 16 to supply power to the control circuit for wheel W7 of the vehicle. Branch leads similar supply seven other substantially identical control circuits associated with the other seven MLG wheels W1–W6 and W8, as indicated by the stub lines or leads terminated by arrow points.

As is evident, with the power supply circuit closed, current will flow via lead 16 through a resistor 18 and conductor 20 to a wheel transducer unit coil 22 and thence to ground. The coil 22 energizes pole means of a stator that is in magnetic juxtaposition to rotary pole means rotated by the wheel W7. As a consequence of the variable reluctance magnetic circuit thus formed, during wheel rotation there is imposed on the current a sine wave potential. The sine wave potential appears at a capacitor 24 (which isolates the D.C. component of the potential) and is rectified and the half-wave is applied to the base of a transistor 26. Capacitor 17 and resistor 18 form a frequency sensing circuit, and rectifier 28, resistor 30 and transistor 26 form a rectifying and wave-shaping net. The potential exhibited on the collector lead of transistor 26 is of square wave-form, as indicated; and, as is evident, is of frequency directly proportional to the rate of rotation of wheel W7. The characteristics of the components are such that the input wave drives transistor 26 to saturation. This eliminates any effects of imperfections in the transducer sine wave such as those caused by vibration or temperature. Thus a pure square wave of potential is produced.

The square-wave potential thus provided at junction 34 of the circuitry by current flow through resistor 29 is applied to the base of transistor 36 by way of capacitor 38; and as a consequence there is produced across resistor 44 and at junction 40 by differentiation by capacitor 38 and resistor 42 a pulse-wave or series of pulses of corresponding frequency. The latter potential is power amplified by transistor 36.

The repetitive pulses appearing at junction 40 are of constant amplitude, and, as noted, are of variable repetition rate or frequency dependent upon the wheel rotational speed. The pulses are subjected to an integration action by the circuit components 46, 48, 50 so that the potential appearing at junction 47 and the base of transistor 52 increases with increase of frequency and vice versa. The decrease of negative potential on the base of transistor 52 decreases the current flow through the transistor. Hence the potential drop across resistor 56 falls and the potential at junction 54 decreases as the wheel speed decreases. That permits discharging (to some extent) of capacitor net 58, 59, which increases the potential applied across the base-emitter terminals of transistor 64 and causes transistor 64 to conduct. (Thus the predetermined bias potential established by diodes 61, 62 exceeds the decreasing variable threshold potential supplied from the wheel circuit at junction 54.) The circuit values are selected or adjusted to bring the bias to represent the maximum desired vehicle deceleration rate.

From the preceding it will be noted that the potential supplied to capacitor 80 will be that from junction 54 of the circuit of the fastest wheel. The charge stored on capacitor 80 is used to energize the locked wheel circuit only, as later explained.

As transistor 64 is biased to conduction by the bias set by the diodes 61, 62, that is, as the predetermined bias potential exceeds the variable potential appearing at junction 54 as the latter potential falls, the current passing through transistor 64 produces a potential drop across resistor 66 that increases the negative bias across the base-emitter of transistor 68, which consequently conducts. That in turn produces a positive bias across the base-emitter terminals of transistor 70, which then conducts and passes current through the coil 72 of the pilot valve to cause relaxation of the brake of wheel W7.

The servo pilot valve is effective, as will presently be explained in connection with FIG. 3, to effect by-passing of fluid under pressure around the brake cylinder in proportion to the strength of the applied signal. Hence the stronger the signal from the circuit of transistor 70 the more the brake-application is reduced or relaxed. In the absence of a signal from the amplifier to coil 72, braking effort is under the direct control of the brake-pedal valve of the operator or pilot.

Referring now to FIG. 3, a wheel-brake control valve V is diagrammatically depicted, hydraulically connected by a conduit P1 to a source (not shown) of liquid under high pressure. The fluid is supplied via the operator's or pilot's brake pedal valve. The valve is also connected to a return conduit P2 and to a conduit P3 leading to the brake cylinder. The pedal valve is normally closed when the brake pedal is not depressed. When the pedal is depressed the pedal valve is opened, supplying fluid under pressure to the brake. The braking action is under the sole control of the pedal valve in the absence of a signal to the servo pilot valve coil 72. When a signal from the amplifier (transistor 70) appears at the servo pilot valve (indicating excessive rate of change of wheel speed), the ratio of the pressure applied in the brake cylinder through conduit P3, to the pressure of the fluid supplied to valve V through conduit P1 by the pedal valve, is reduced in proportion to the strength of the signal. In the absence of a signal a balance of forces is set up between the inlet pressure and the brake pressure in conduit P3. By means of feedback pistons in the ends of the servo pilot valve (a flapper-nozzle valve) the forces on the slide of valve V are balanced with inlet and outlet (P3, or brake) pressures equal. When a signal is applied, the servo pilot valve applies a differential pressure to the slide of valve V and unbalances it in the direction to open the port to return conduit P2, thus relaxing the braking effort until a balance is again achieved and the slide centered with both inlet and return closed to the brake conduit P3. When the signal decreases, the reverse action occurs, with a valve spring applying a small bias in the open direction. Thus the effect of a signal is to decrease the pressure of fluid applied to the brake.

A small shutoff valve Vs, normally closed as shown in FIGURE 3, is used on the MLG valves V to stop all "quiescent" flow through the servo pilot valve whenever parking brakes are required. Valve Vs is solenoid-operated by power supplied through a switch operated by the parking brake lever.

The nose wheels have control means and circuits similar to those of the MLG wheels. The nose wheel circuits, being similar in operation, are not illustrated.

Brake application prior to the wheels assuming a load is prevented, in the exemplary aircraft brake control system, by a current signal through rectifier 76 and resistor 78 which signal is effective until removed by operation of the "squat" switch 100 as the wheels assume full load in landing. The first wheel to roll supplies potential to the central memory unit comprising large capacitor 80 and resistor 82, so that if one or more wheels remain in the air (not loaded) after the squat switch moves to "on ground" position, locked wheel protection is still provided. The potential across capacitor 80 is supplied by the fastest wheel, and the circuit components are of values which maintain that potential somewhat (for example 30%) below that normally appearing across the rate unit (capacitors 58, 59).

Means, including what is herein termed a "locked" wheel circuit, are provided to induce production of a large-value signal to coil 72 if a wheel locks. The circuit comprises rectifier 86, resistors 87 and 88, capacitor 89, and transistor 90. As long as a square wave is evident at the collector of transistor 26, capacitor 89 remains charged and hence transistor 90 is biased against passing current. The latter transistor is provided with a selected bias by resistors 91 and 92 as indicated. If wheel lock occurs, the square wave normally apparent at junction 34 is no longer evident, and capacitor 89 discharges and capacitor 80 of the common memory unit places a bias across transistor 90 and the latter conducts. The resultant potential drop across resistor 77 is amplified by the circuits of transistors 81 and 70 to produce a very strong current signal to coil 72 of the servo pilot valve. The effect is to powerfully and rapidly remove braking pressure or effort from the brake of the locked wheel, and thus the locked wheel is released to rotate. The locked-wheel circuit is effective down to speeds of approximately five knots during rapid deceleration. Below that speed (as registered by the fastest wheel) the memory capacitor 80 does not have sufficient charge to provide the necessary bias signal to cause transistor 90 to conduct. During normal operation on the ground the memory capacitor 80 does not charge sufficiently to allow release when the vehicle is parked, taxiing, turning or pivoting (during which the pivot wheel is in locked-wheel condition). It should be noted that the locked-wheel signal is much stronger than that produced in response to incipient skidding, and hence brake-releasing is much more vigorous.

As previously noted, means are provided to relax application of braking effort at any wheel which begins to decelerate into a skid. After the deceleration ceases the brake pressure must not be returned to the same level that caused the incipient skid or incipient skidding will immediately recur. Hence an additional control is needed to maintain the brake pressure just below that which will cause incipient skid. The means for providing these and other additional desirable control effects is herein termed a pressure bias modulation circuit. One such circuit means is provided for each respective wheel, and is connected to the final stage of signal amplification as indicated in FIGS. 1a, 1b and 2. Referring to FIG. 1b, the pressure bias modulation circuit comprises rectifiers 92, 93, and 94, resistors 95, 96 and 97, transistor 98 and capacitance net 99, comprising capacitors 101 and 102, all interconnected as shown. Each time a valve-controlling signal is developed by transistor 70, the increasing emitter potential blocks diodes 92 and 93 and thereby causes the current through resistor 95 to flow entirely through diode 94 and thus increases the potential drop across resistor 97 and thus to increasingly charge capacitors 101 and 102 through diode 94. As long as the control signal exists this charge continues to increase thereby increasing the potential at the base of transistor 98. As the control signal decreases and lowers the potential at the emitter of transistor 98 the potential across capacitor net 99 causes conduction by transistor 98 which produces a bias signal at the base of transistor 70 thus maintaining a level of conduction to the valve coil 72. Hence the brake pressure continues relaxed to an extent dependent upon the duration and amplitude of the rate control signal. The charge on capacitor net 99 decays at a rate governed by resistor 97 and thus the bias on transistor 70 decreases with time in the absence of a subsequent rate control signal. Thus each time a skid control is needed an additional charge is added to capacitor net 99 to increase the bias level and this charge is allowed to deplete during the time between skid signals. This action maintains the brake pressure at the mean level for most effective braking with small skid control cycles acting to adjust the mean level to meet the dynamic conditions of braking.

While the particular automatic brake control system herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A brake-control system for controlling application of braking effort to a wheel of a vehicle having a plurality of independently-rotatable brake-equipped wheels, said system comprising, in combination with the wheel and associated brake:

means to produce a substantially constant electrical bias potential of predetermined value representative of the maximum permissible rate of deceleration of the vehicle in terms of radians per second per second deceleration of the wheel;

means to produce and register a variable electrical potential the value of which varies in proportion to the rate of change of rotational speed of the wheel;

circuit means including transistor means biased to a conducting state by said bias potential and to a non-conductive state by said variable electrical potential thereby responsive to reduction of said variable electrical potential to a value below that of said bias potential to produce a control signal; and means responsive to the said control signal to relieve braking effort applied to the wheel by the associated brake.

2. A brake-control system for controlling application of braking effort to a wheel of a vehicle having a plurality of independently-rotatable brake-equipped wheels, said system comprising, in combination with the wheel and associated brake:

means to register an electrical quantity of predetermined value representative of the maximum rate of deceleration of the vehicle in terms of radians per second per second deceleration of the wheel;

means to produce and register a variable electrical quantity the value of which varies in proportion to the rate of change of rotational speed of the wheel;

means responsive to the said electrical quantity of predetermined value to render ineffective the registered variable electrical quantity until the value of the latter falls below a value related to said predetermined value; and means responsive to the registered variable electrical quantity when the value thereof so falls below said value related to said predetermined value, to relieve braking effort applied to the wheel by the associated brake, said second named means comprising transducer means operated by the wheel to form an electric wave of frequency proportional to the rotational speed of the wheel, means for sensing and rectifying the wave to a series of half wave pulses, means for producing from the half wave pulses a square wave, means for producing from the square wave a series of sharp-peak pulses; means for integrating the sharp-peak pulses, and means utilizing the integrated output to provide said variable electrical potential.

3. A brake control system for controlling the extent of application of fluid under pressure to the brake cylinders of the load bearing wheels of a vehicle having independently-rotatable brake-equipped wheels, said system comprising with the wheels and associated brakes:

first means to produce a substantially constant electrical potential representative of the maximum permissible rate of change of wheel rotational speed corresponding to the maximum permissible rate of deceleration of the vehicle;

second means including generating means, responsive to the rotation of the respective wheels to produce respective variable electrical potentials each representative of the instantaneous rate of change of rotational speed of the respective wheel during application of fluid under pressure to the brake cylinders of the wheels, and a common means to which the second means of each of the wheels are connected;

and for each wheel a third means, including transistor means electrically connected to the respective one of said first means and to said common means, effective in response to decrease in value of said variable electrical potential below a value bearing a fixed relation to said substantially constant potential to cause reduction of pressure of the fluid in the brake cylinder of the wheel.

4. A system according to claim 3, in which said third means is effective to cause reduction of pressure of the fluid in the brake cylinder of the respective wheel in proportion to the extent the value of said variable electrical potential falls below said value bearing a fixed relation to said substantially constant potential.

5. A system according to claim 3, in which each of said second means comprises means responsive to reduction of the respective variable electrical potential to a negligible value incident to locking of the respective wheel, to cause rapid reduction of brake cylinder pressure at that wheel to a negligible value by the respective third means.

6. A system according to claim 3, in which for each wheel are provided means connected to the respective third means and responsive to fluctuations in the control effected by the said respective third means, to delay reapplication of increased pressure to the fluid in the respective brake cylinder until the fluctuations disappear.

7. A braking control system for controlling the extent of application of a brake to a wheel unit in a vehicle having a plurality of independent load-bearing wheel units each having a respective brake and a brake-applying device, said system comprising, for each wheel unit:

first means, comprising power supply means, and a wheel transducer means and circuit means connected therewith, constructed and arranged to provide a variable electrical potential representing the rate of decrease of rotational speed of the respective wheel unit;

second means, connected to said first means and effective to provide a substantially constant electrical potential representing a predetermined maximum normal permissible rate of decrease of rotational speed of the wheel units of the vehicle; and third means, responsive to decrease of said variable electrical potential for any wheel unit below a predetermined value fixedly related to said constant electrical potential to decrease the effectiveness of the brake-applying device of that wheel unit by graduated variable control of said device in accord with the extent of variance of said variable electrical potential from said predetermined value, whereby the rates of decrease of rotational speed of the wheel units are maintained below said predetermined maximum normal permissible rate.

8. A braking control system according to claim 7, in which said third means is effective in response to increase of said variable electrical potential toward said predetermined value thereof, to increase the effectiveness of the brake-applying device by control of the device.

9. A braking control system according to claim 8, including electronic means connected to said third means and responsive to changes of action thereof to delay increase of the effectiveness of the brake-applying device.

10. A system according to claim 7, comprising means connected to the said circuit means of each of a plurality of the said wheel units and effective in response to sudden absence of said variable electrical potential corresponding to any wheel unit to produce a third electrical potential representative of the absence of said variable electrical potential in the third means corresponding to said wheel unit, and connections applying said third electrical potential to said third means to substantially instantly render ineffective the brake-applying device of that wheel.

11. A braking-control system for a vehicle having a plurality of wheels each having operatively associated therewith a respective brake and brake-applying device and an electrical wheel-speed transducer effective to produce an alternating potential of variable frequency proportional to the rotational speed of the respective wheel, said system comprising:

first means, comprising power means, connected to the several transducer means and for any particular wheel of said wheels effective in response to the corresponding alternating potential to produce a variable potential the value of which is inversely proportional to the frequency of the alternating potential and representative of the rate of change of rotational velocity of the particular wheel;

second means, connected to the first means and effective to provide a predetermined substantially constant reference potential the value of which is representative of the maximum permissible rate of deceleration of the vehicle as expressed in terms of radians per second per second of deceleration of a wheel of the vehicle;

third means, connected to said first means and to said second means, comprising means rendering ineffective said variable potential until the value thereof decreases below a potential bearing a predetermined relationship to said substantially constant reference potential;

and fourth means, connected to said third means and effective in response to said variable potential when it so decreases, to control the brake-applying device of the particular wheel to relax braking at that wheel to an extent proportional to the extent of the said decrease of said variable potential below said potential bearing a predetermined relationship to said substantially constant potential.

12. A braking control system for a multi-wheeled aircraft having for each wheel a brake and a brake-applying device for increasing and decreasing brake application, and hydraulic means including a pilot's brake valve and for each wheel a slave valve for controlling application of fluid under pressure to the brake-applying device, said system comprising a power supply and connected thereto a respective electronic system for each wheel comprising:

a wheel-speed transducer connected to said power supply and operated by the wheel and effective to produce an alternating potential the frequency of which is proportional to the speed of rotation of the wheel;

a wave-translating and modifying circuit, connected to said transducer and to said power supply and effective in response to said alternating potential to produce a variable potential the value of which is representative of the rate of rotational deceleration of the wheel;

circuit means connected to the electronic systems of the several other wheels and effective to register a substantially constant potential the value of which is representative of a predetermined maximum permissible rate of deceleration of the wheels of the vehicle in the absence of skidding;

control circuit means connected to said circuit means and to said wave translating and modifying circuit and responsive to decrease of said variable potential to a value below a predetermined value determined by said substantially constant potential to produce an output signal; and means connected to receive said output signal and effective in response thereto to control the slave valve for the wheel to decrease the pressure of the fluid applied to the brake-applying device of the wheel to an extent dependent upon the difference between said predetermined value and that of said variable potential;

whereby incipient skidding of any of said wheels is detected and reduction of brake-application effected to avoid skidding of the wheel.

13. A braking control system as defined in claim 12 characterized in that said fourth means includes brake pressure modulating means including means for causing the brake applying pressure to be held at a reduced but gradually increasing value immediately following relaxation of braking at that wheel thereby avoiding the reapplication of the former braking pressure abruptly and prematurely.

14. A braking control system as defined in claim 13 characterized in that said brake pressure modulating means includes means for causing increase of braking pressure at a gradually decreasing rate after relaxation of the brakes.

15. A braking control system as defined in claim 13 characterized in that said brake pressure modulating means includes means responsive to the magnitude of the brake relaxing operation to vary the magnitude and duration of the brake pressure modulating operation.

16. A braking control system as defined in claim 7 characterized in the provision of fourth means responsive to increase of said variable electrical potential for any wheel above a predetermined value relative to said substantially constant electrical potential to decrease the effectiveness of the brake applying device by an additional and variable increment and to maintain said additional increment in effect at a decreasing rate immediately following a period of relaxation of brake application thereby to avoid objectionably abrupt return to braking at the called-for higher pressure.

17. In an airplane brake-controlling system for an airplane having port and starboard load-bearing wheels each of which wheels having respective brake means including a brake and a brake-applying and releasing means, the combination therewith comprising:

first means, including for each wheel a respective wave signal generating means comprising a polar structure rotated by the wheel whereby the frequency of the wave signal is proportional to the rotational speed of the wheel;

second means, connected to receive the wave signal and to produce a second signal a significant characteristic of which is representative of the time rate of decrease of frequency of said first wave signal and hence of the time rate of decrease of rotational speed of the wheel;

third means, connected to said second means, for providing an electrical signal representative of the maximum permissible rate of decrease of rotational speed of a wheel and for effecting comparison therewith of said second signal and to produce a control signal incident to change of said characteristic of said second signal to a value representing a time rate of decrease of rotational speed of the wheel in excess of said permissible rate, and said third means comprising means connected to receive said control signal and responsive thereto to control operation of said brake-applying and releasing means to relax application of the brake of the respective wheel.

18. In a braking control system for an aircraft having independent port and starboard load-bearing wheels each having associated therewith a respective brake means including a brake and controllable brake-applying and releasing means and electromagnetic means for controlling the brake-applying and releasing means, said electromagnetic means comprising a magnet coil, the combination therewith comprising:

for and in operative relationship with each wheel a respective first means including means having a device controlled by the wheel to produce a signal representative of the speed of rotation of the wheel and for producing a second signal representative of the rate of rotational deceleration of the wheel and for producing a third signal each time the second signal represents a rate of rotational deceleration in excess of a predetermined maximum desired rate and for applying each such third signal to the said magnet coil to cause relaxation of application of the brake of the wheel;

for each wheel and connected to the respective one of said first means, a respective second means including a circuit comprising a capacitive circuit and resistive bleed means therefor, said second means being connected to the corresponding one of said first means for charging of the respective capacitive circuit to an extent dependent upon the frequency and magnitude of the said third signals applied to the corresponding magnet coil and said respective second means producing a feed-back signal and comprising means connected to the corresponding one of said first means for applying thereto such produced feed-back signal to cause said corresponding first means to continue to produce and apply to the magnet coil at a decaying rate a continuing third signal, whereby full reapplication of the brake of a wheel following relaxation of that brake is delayed according to the frequency and magnitude of such third signals applied to the magnet coil corresponding to that brake.

19. A brake-controlling system for an aircraft having a load-bearing wheel and brake means associated with the wheel and including a brake and brake-applying and releasing means comprising an electromagnet effective when energized to cause reduction of application of the brake, said system comprising in combination therewith:

first means, including rotatable means affixed to rotate with the wheel, for producing an electrical signal representing rotational speed of the wheel;

second means, connected to said first means to receive said electrical signal and effective to produce a second signal representative of the time rate of decrease of rotational speed of the wheel;

third means, connected to said second means, for providing a determinable signal representative of a desired instantaneous maximum time rate of decrease of rotational speed of the wheel, and for effecting electrical comparison of said second signal and said determinable signal and for producing a control signal incident to production of a said second signal representative of a time rate of decrease of rotational speed in excess of that concurrently represented by said determinable signal; and fourth means, connected to said third means and to said electromagnet, effective to transfer any produced control signal to said electromagnet to energize the latter to cause relaxation of application of said brake.

20. A braking-control system for a vehicle having a plurality of wheels each having operatively associated therewith a respective brake and brake-applying device and an electrical wheel-speed transducer effective to produce a potential of variable frequency the frequency of which is proportional to the rotational speed of the respective wheel, said system comprising:

first means, comprising power means, and for each wheel a circuit means connected to the respective transducer means for the respective particular wheel and to the power means effective in response to the corresponding produced variable frequency potential to produce another potential the value of which is related to the frequency of the variable frequency potential and representative of the rate of change of rotational velocity of the respective particular wheel;

second means, including for each wheel a respective potential means connected to the respective one of said circuit means and effective to provide for that wheel a predetermined reference potential the value of which is respresentative of a predetermined maximum rate of deceleration of the vehicle as expressed in terms of radians per second per second of deceleration of the respective wheel;

third means, including for each respective wheel a means connected to the respective one of said circuit means and to said second means and comprising means rendering ineffective said variable potential until the value thereof changes so as to bear a predetermined relationship to said reference potential for the respective wheel;

and fourth means, including for each wheel a respective means connected to said third means and effective in response to said variable potential when it so changes, to control the brake-applying device of the respective wheel to relax braking at that wheel.

21. A brake-controlling system for an aircraft having a load-bearing wheel and brake means associated with the wheel and including a brake and brake-applying and releasing means comprising an electromagnet effective when energized to cause reduction of application of the brake, said system comprising in combination therewith:

first means, including means for generating a signal of magnitude proportional to excess of the rate of rotational deceleration of the wheel above a predetermined desired maximum rate of rotational deceleration and means for establishing a representation of said desired maximum rate;

second means connected to said first means for receiving the generated signal therefrom and including energy supply means and energy-flow control means responsive to said generated signal to pass energy from said supply means to said energy-utilizing means in proportion to the magnitude and duration of said signal;

third means connected to said second means and effective to store energy and to increase the storage of energy incident to supply of energy to said energy-utilizing means to an extent proportional to the frequency occurrences of such supply of energy, said third means being effective upon decline of said generated signal to supply to said energy-flow control means a substitute signal serving as a prolongation of said generated signal to effect extension of the duration of energization of said energy-utilizing means to prolong reduction of application of said brake;

and fourth means connected to said second and third means for selectively supplying energy to said energy utilization means and to said third means whereby said energy utilization means is maintained continuously energized at least to a minimum level at all times.

22. A brake-controlling system according to claim 21, in which said aircraft has a plurality of other load-bearing wheels each similarly having associated therewith a representative brake, brake-applying means and energy-utilizing means, and in which for each of said other wheels there is an associated similar first means, and in each of which said first means there is a respective means effective to produce a respective wheel speed signal of magnitude representative of the instantaneous rotational speed of the respective wheel;

fifth means connected to all of said first means for storing energy in proportion to that one of the produced wheel signals representing the fastest rotating one of all said wheels;

and sixth means including for each wheel a respective means connected to the respective first means and to said fifth means and effective in response to locking of the respective wheel to use energy stored by said fifth means to activate the respective energy-flow control means to quickly pass a large amount of energy to the respective energy-utilizing means to cause rapid reduction of application of the brake of the associated wheel.

References Cited by the Examiner

UNITED STATES PATENTS

| | | | |
|---|---|---|---|
| 2,663,521 | 12/1953 | Yarber | 188—18 X |
| 2,788,186 | 4/1957 | Wilson | 303—21 X |
| 3,017,145 | 1/1962 | Yarber. | |
| 3,069,623 | 12/1962 | Murgio | 324—79 X |

FOREIGN PATENTS 880,767  10/1961  Great Britain.

EUGENE G. BOTZ, *Primary Examiner.*